United States Patent [19]

May

[11] Patent Number: 4,753,144
[45] Date of Patent: Jun. 28, 1988

[54] PORTABLE SAW MILL
[76] Inventor: Jim May, 10751 SE. 258th Pl., Gresham, Oreg. 97030
[21] Appl. No.: 900,083
[22] Filed: Aug. 25, 1986
[51] Int. Cl.$^4$ .............................................. B27B 3/26
[52] U.S. Cl. .................................. 83/102.1; 83/471.2; 83/485; 83/748
[58] Field of Search ................... 83/102.1, 748, 471.2, 83/475, 476, 477, 486, 487, 488

[56] References Cited
U.S. PATENT DOCUMENTS

| | | | |
|---|---|---|---|
| 1,356,110 | 10/1920 | Neal | 83/102.1 |
| 1,602,040 | 10/1926 | Neal | 83/102.1 |
| 3,398,771 | 8/1968 | May | 83/471.2 |
| 3,401,785 | 9/1968 | Ferrari | 83/102.1 |
| 3,548,896 | 12/1970 | Larsen | 83/475 |
| 4,270,423 | 6/1981 | Angelo | 83/102.1 |
| 4,571,840 | 2/1986 | May | 33/185 |

Primary Examiner—E. R. Kazenske
Assistant Examiner—Hien H. Phan
Attorney, Agent, or Firm—Eugene M. Eckelman

[57] ABSTRACT

A horizontal disc is supported on an arm on a portable saw mill carriage in a plane such that the disc is arranged to follow a horizontal saw kerf to provide vertical stabilization between a log and a carriage. Also a foot is mounted on an arm and is arranged to engage the face portion of a log to provide lateral stabilization. This arm is laterally adjustable for locating it according to the depth of cut. Furthermore, a hold-down wheel assembly is supported on a link which is urged downwardly to provide vertical stabilization between a log and the carriage.

5 Claims, 3 Drawing Sheets

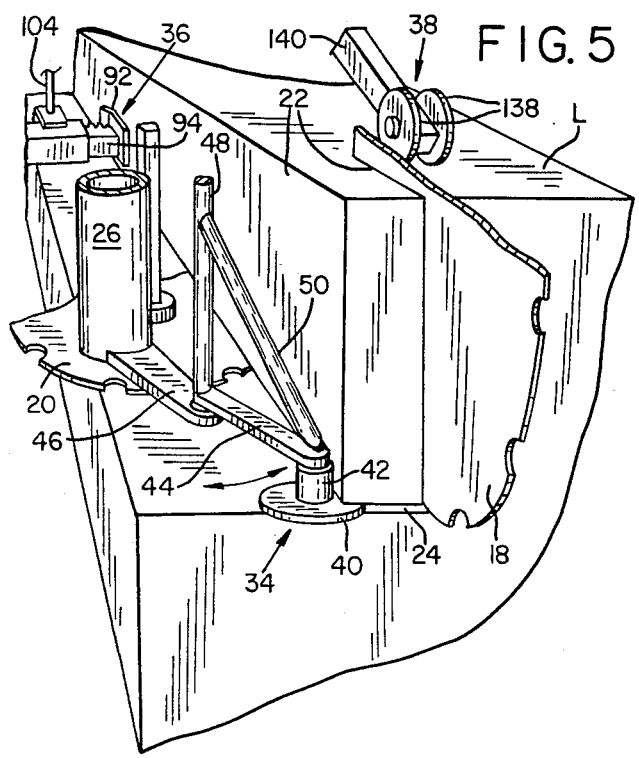
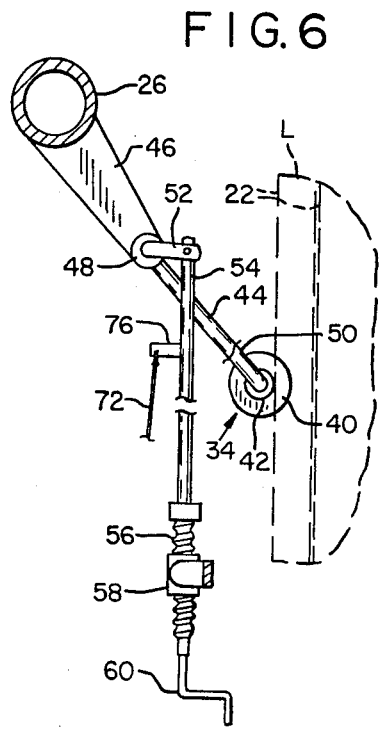
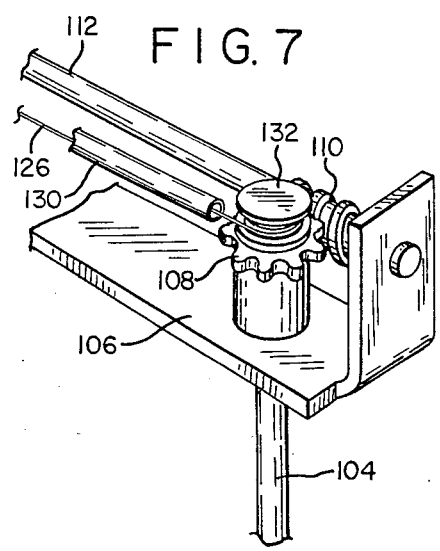
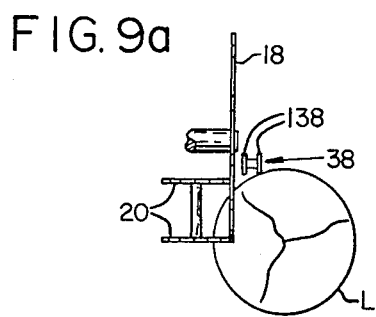
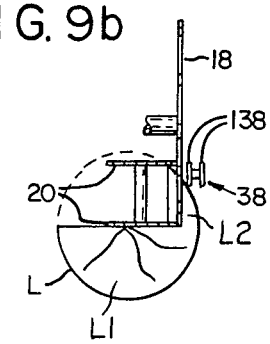
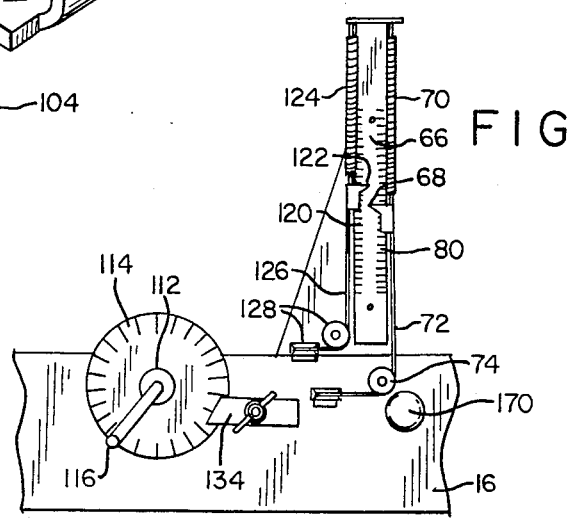

PORTABLE SAW MILL

BACKGROUND OF THE INVENTION

This invention relates to new and useful improvements in portable saw mills.

Portable saw mills have heretofore been provided for the purpose of transporting the mill directly to the site of a log or to a central area wherein logs do not have to be transported major distances. This general type of saw is illustrated in my prior U.S. Pat. No. 3,398,771. This type of mill has been found to be very economically feasible for the smaller type operations wherein the mill can be taken to the sites as mentioned above.

In the use of a portable saw mill of this type, it has frequent use for sawing small logs and this creates some rather serious problems in making the saw cuts since these smaller logs are difficult to hold steady at certain times when the saw cuts are being made. That is, the pulling power of the saw teeth frequently cause a small log to wobble or chatter and this can produce uneven or unacceptable saw cuts. In addition, most small logs are not precisely straight and thus it is difficult to hold the log or slabs being cut therefrom steady. Further yet, the portable mill utilizes long supporting frames for the carriage and due to the length of the frame it oftentimes bends slightly and this of course also can produce uneven cuts.

SUMMARY OF THE INVENTION

According to the present invention and forming a primary objective thereof, a portable saw mill is provided which incorporates therein one or more stabilizing means arranged to stabilize the log or parts cut therefrom and also arranged to use a log to reinforce the longitudinal frame on which a carriage travels.

A more particular object is to provide first stabilizing means on the carriage having a horizontal disc which rides in a saw kerf for the purpose of providing vertical stabilization between a log and the carriage.

Another object is to provide second stabilizing means comprising hold-down wheels on the carriage arranged to forcibly press down on a log to provide vertical stabilization between a log and the carriage.

Another object is to provide third stabilizing means employing an abutment foot on the carriage having a face surface which slidably engages a vertical surface of a log to control the depth of cut and also for providing lateral stabilization between the log and the carriage.

Further objects of the invention are to provide convenient operator controls for the stabilizing means, some of which have adjustable controls and release means, and some of said stabilizing means also having indicating means to show the position of such stabilizing means relative to a log.

In accomplishing these objects, the first stabilizing means comprises a horizontal disc and an arm arranged to support the disc on the carriage in a plane such that the disc has a portion arranged to follow a horizontal saw and project into a kerf made by the horizontal saw. Operator adjustment and indicating means are provided for this stabilizing means at the operator's control end of the carriage. The second stabilizing means comprises an abutment foot having a face surface and an arm integral with the abutment foot arranged to support it on the carriage with the face surface in slidable engagement against a vertical surface of a log, this arm being laterally adjustable for locating the abutment foot in selected lateral adjustments for varying the depth of cut of the saw blades and also to provide a stabilizing function. Operator adjustment and indicating means are provided for this latter stabilizing means at the operator's control end of the carriage. The third stabilizing means comprises horizontal axis hold-down wheels, and link means arranged to support the wheels on a carriage on the outer side of the saw cut. A pressure operating mechanism is combined with the link means to forcibly press the wheels down on a log to provide a vertical stabilizing function. This latter stabilizing means utilizes disabling mechanism operative at the end of a cut to automatically disable such stabilizing means. This latter mechanism utilizes operator actuating means to initiate use thereof.

The invention will be better understood and additional objects and advantages will become apparent from the following description taken in connection with the accompanying drawings.

BRIEF DESCRIPTION OF THE DRAWINGS

FIG. 5 is a fragmentary perspective view showing details of stabilizing means, this view showing in particular a first stabilizer employing a horizontal disc that rides in a horizontal saw kerf;

FIG. 6 is a sectional view taken through the carriage and looking down on the stabilizer of FIG. 5;

FIG. 7 is an enlarged fragmentary perspective view taken from a position similar to that of FIG. 2 and showing a detail of stabilizer operating means;

FIG. 8 is an enlarged fragmentary elevational view of a portion of the operator's control end of the carriage showing in particular indicating means designating the position of stabilizers, and FIGS. 9a and 9b show some log cuts for the purpose of illustrating functions of the present stabilizers.

DETAILED DESCRIPTION OF A PREFERRED EMBODIMENT

Figure 1:
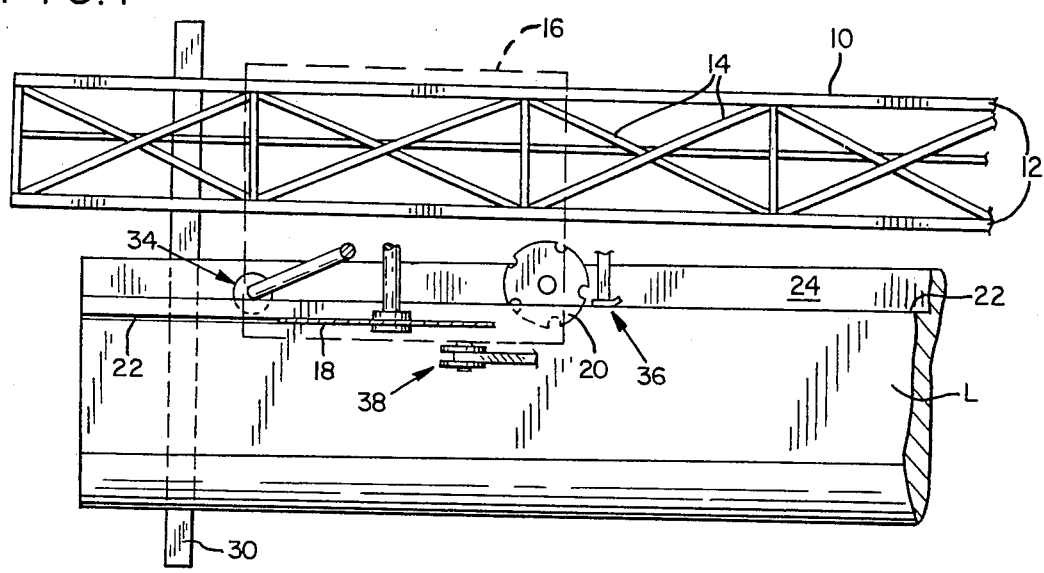
FIG. 1 is a diagrammatic top plan view of portable saw mill apparatus showing stabilizing means of the invention.

With reference first to FIGS. 1 through 4, the present invention is shown in connection with a portable saw mill which is anchored securely to a log L, or vice versa, and successive cuts are made longitudinally of the log. The numeral 10 designates a conventional elongated saw carriage frame having longitudinal frame members 12 and reinforcing frame members 14. Frame 10 supports a movable carriage 16, and this carriage carries a power driven vertical saw blade 18 and one or more power driven horizontal saw blades 20. Blades 18 and 20 cooperate upon longitudinal movement of the carriage frame 16 to provide vertical and horizontal cuts 22 and 24 respectively on the log. The carriage has a depending main post 26, FIG. 5, as in conventional structures, for support of the horizontal saws and other mechanism.

Frame 10 can be temporarily connected to the log L by laterally disposed rail members 30, FIG. 1, secured as the frame is laterally adjustable relative to the log in a well known manner for producing the desired board thickness, and also well known adjustment means are provided on the carriage to provide desired board widths. The pulling forces of the saw blades in the log exert distorting forces, particularly where the log is relatively small or where initial and final cuts are being made. The present stabilizing means stabilize the log and carriage and in brief comprise three elements. The first stabilizer 34 comprises a disc which trails the saw cuts and is arranged to follow in a horizontal kerf. The second stabilizer 36 comprises an abutment foot mounted on the carriage and arranged for abutment against a vertical edge of the log. The third stabilizer 38 comprises hold-down means on the carriage capable of riding on the log for stabilizing the log or carriage. All of these stabilizers can be independently used or can cooperate in any combination thereof for better sawing.

Figure 2:
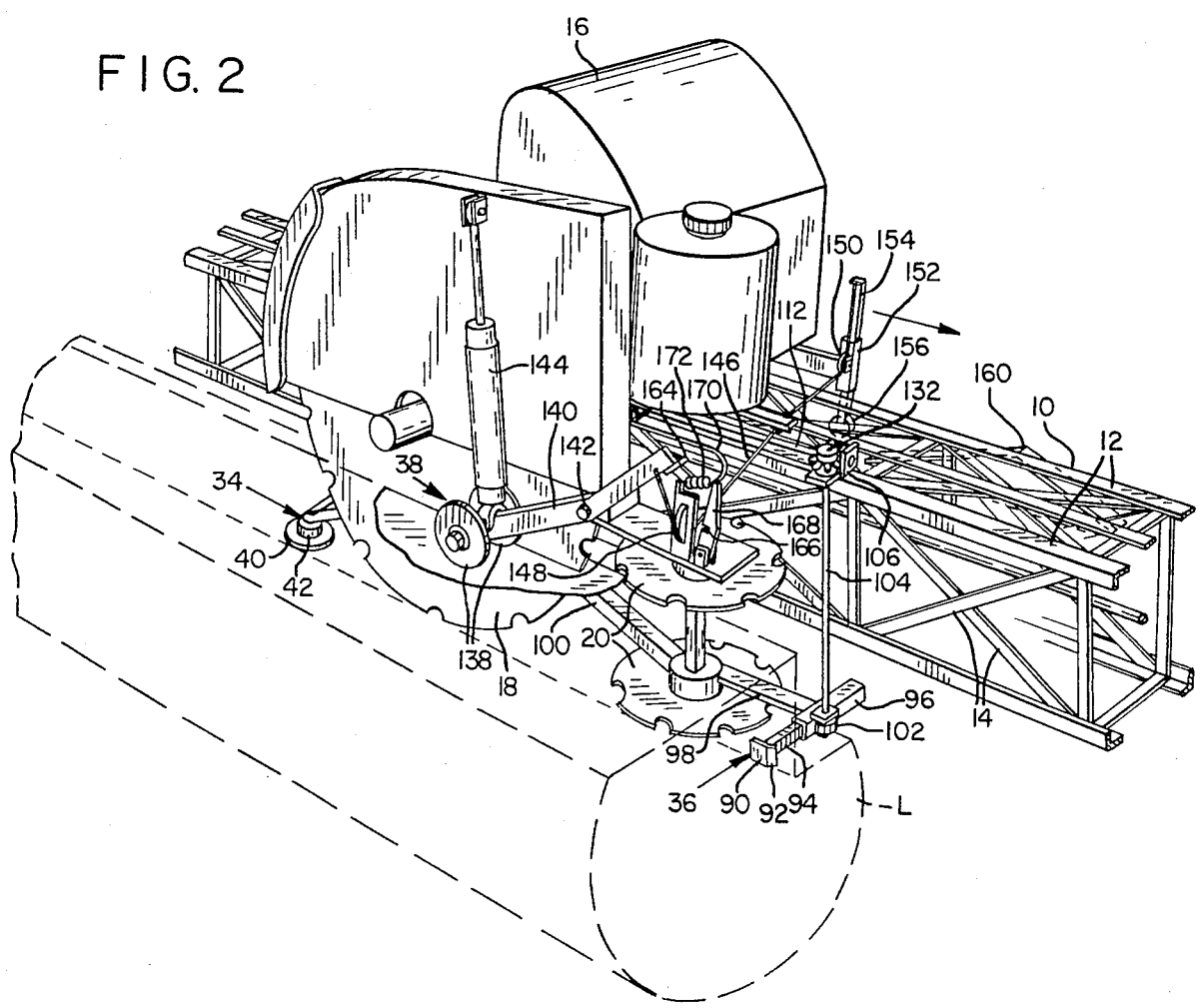
FIG. 2 is a perspective view of the saw mill and illustrating in greater detail the stabilizing means of the invention, this view being taken obliquely from the front and from one side of the carriage.
Figure 3:
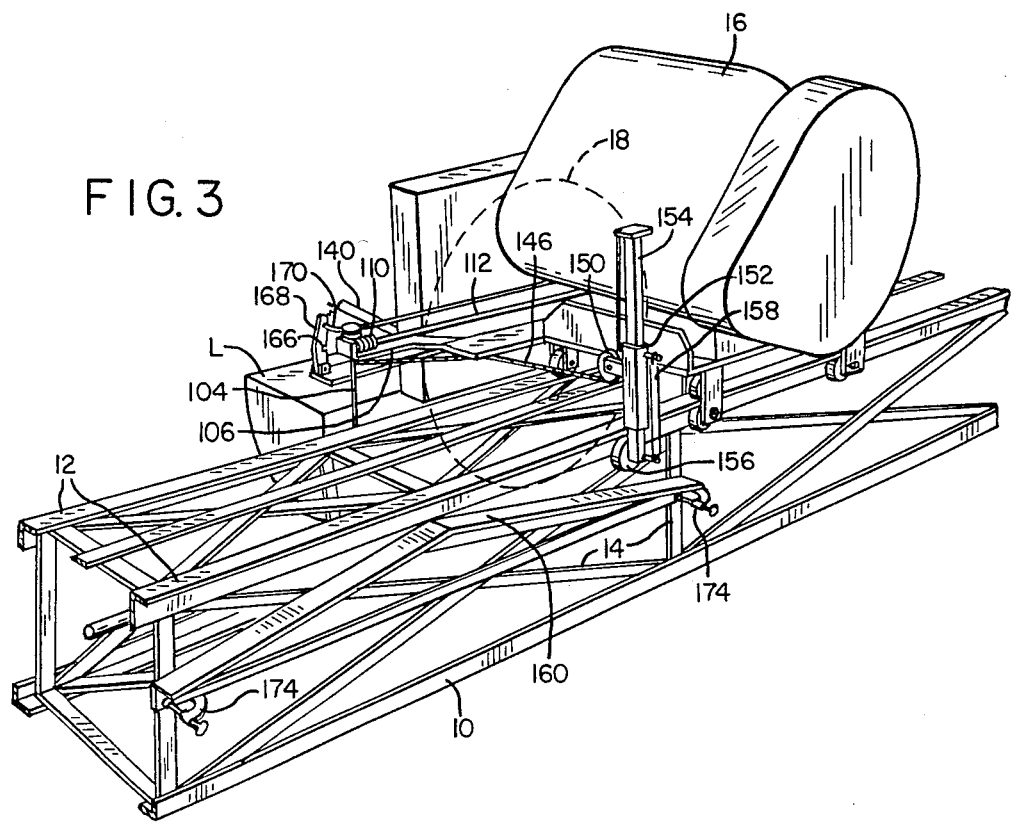
FIG. 3 is a perspective view taken from the opposite side of the carriage from that shown in FIG. 2.

With further reference to FIGS. 2, 5 and 6, the first stabilizer 34 comprises a horizontal disc 40 and an upstanding hub 42 having journaled support on the end of a horizontal arm 44 pivotally supported on a second horizontal arm 46 integrally secured to the post 26. Arm 44 is secured to an upstanding post 48. A reinforcing strut 50 is secured between arm 44 and post 48. The post 48 has upper journaled connection in the carriage and has a horizontal lever arm 52 secured to an upper end thereof. The lever arm 52 is pivotally connected to a push rod 54 to which a worm gear 56 is rotatably attached for push pull movement. Worm gear 56 is threadedly supported in a journal block 58 secured to the underside of the carriage 16. Worm gear 56 terminates at its free end in a crank handle 60, best seen in FIG. 4, at the operator's control end of the carriage.

It is apparent that upon operation of the worm gear 56, the arm 44 which carries the disc 40 can be rotated toward or away from the saw 18. As will be more apparent hereinafter, the function of the disc 40 is to ride in a horizontal kerf made by a horizontal saw blade 20. The radius of the disc beyond the hub 42 is less than a usual depth of kerf whereby the hub 42, which is freely rotatable on the arm 44, will abut against a vertical portion of the log and roll freely thereon. As will be more apparent hereinafter, abutment of the log by the hub 42 will provide some lateral stabilization between the carriage and the log, the support arms 44 and 46 and reinforcing member being of sturdy construction to provide lateral and vertical stabilization.

Figure 4:
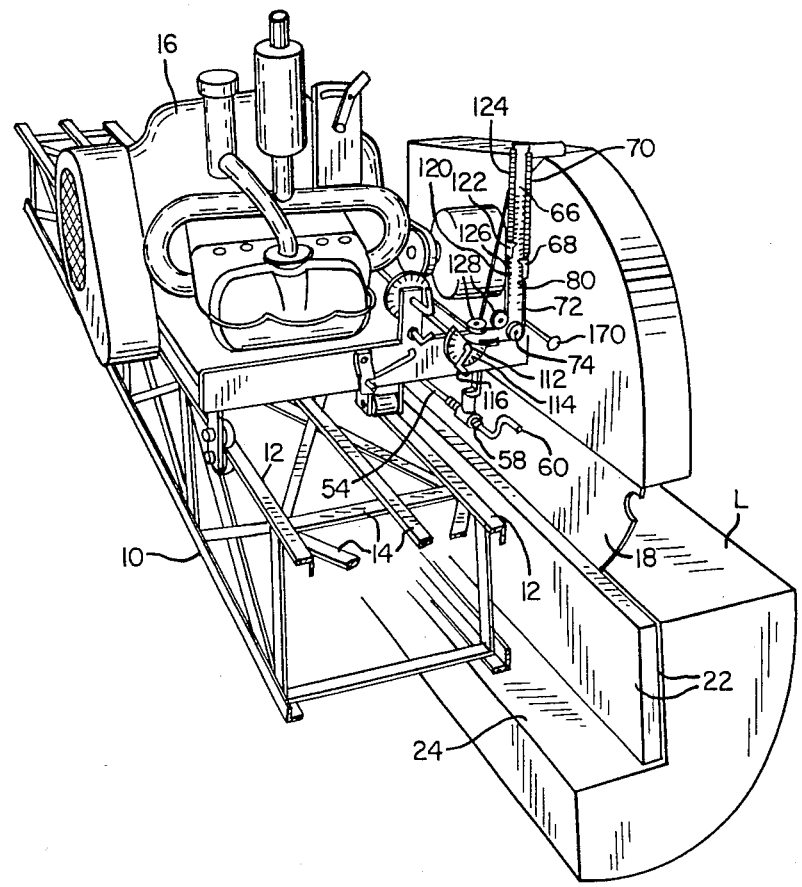
FIG. 4 is a perspective view of the saw mill taken from the opposite end from that of FIG. 2, namely, from the operator's control end.

Indicating means are provided at the operator's control end of the carriage so that the operator can tell the lateral positioning of the disc 40. For this purpose, an upstanding scale 66, FIGS. 4 and 8, is provided and has a pointer member 68 slidably supported along one edge and urged upwardly by a tension spring 70 connected between the top of the scale and the pointer. A cable 72 connected at one of its ends to the pointer 68 operates over a lower sheave 74 and extends to a laterally extending finger 76, FIG. 6, on the push rod 54. As the push rod 54 is moved forwardly or rearwardly to swing the arm 44 and the disc 40 relative to the vertical saw, the pointer 68 will move up and down on the scale 66, such scale being provided with suitable indicia 80 which is preselected to show positioning of the disc 40. As apparent, the pointer is pulled downwardly by the cable for one of its movements and returned by the spring 70 in the opposite direction.

With reference now to FIG. 2, the second stabilizer 36 comprises a foot member 90 arranged to abut against the log. This foot member has an angled leading portion 92 arranged to slide along a surface of the log without biting into the log. Foot member 90 is integral with a laterally extending rack arm 94 movably supported in a housing 96 integrated solidly with the carriage frame by a sturdy strut 98 which forms an extension of a shaft-supporting strut 100 extending integrally from the main post 26. Strut 98 supports the housing 96 and the foot member 90 in a firm lateral position so that it is capable of providing lateral stabilization of the carriage relative to a log. Rack arm 94 is engaged by a worm gear 102 journaled on the housing 96 and integrated with an upright shaft 104 journaled in a bracket 106, best seen in FIG. 7, integral with the carriage and terminating at its upper end in a pinion gear 108 secured thereto. Pinion gear 108 is in mesh with a worm gear 110 keyed on a horizontal shaft 112 journaled in the bracket 106 at one of its ends and in a wall portion of the carriage at the operator's control end. The end of shaft 112 integrally carries a graduated disc 114, FIG. 8, and a crank handle 116. By operation of the crank handle 116, the foot member 90 can be selectively adjusted laterally to engage the log or it can be retracted from the log, its extent of travel in the housing 96 being sufficient to engage a log in the various thicknesses of lumber cuts.

With reference to FIGS. 4 and 8, the gauge 66 has graduations 120 on the opposite edge from the graduations 80, and these graduations are utilized to indicate to the operator the position of the foot member 90. A pointer 122 is slidably supported on the other edge of the gauge 66 from the pointer 68 and is urged upwardly by a tension spring 124 connected to the top of the gauge. A cable 126 connected to the pointer operates over sheaves 128 and leads forwardly through a protective tube 130, FIG. 7, for wound connection on a capstan 132 integral with the top of pinion gear 108. By this arrangement, adjustment of the foot member 90 laterally will be indicated by graduations 120 on the gauge 66. In addition, the graduated disc 114 will show positioning of the foot, and in a preferred arrangement, the parts are arranged such that a rough positioning will be indicated by the pointer 122 and graduations on the disc 114 will indicate fine adjustment. A clamp bar 134 is provided on the carriage to lock the disc 114 and thus the foot member 90 in a secured selected position.

The third stabilizer 38, best seen in FIG. 2, comprises one or more wheels 138 having free rolling support on one end of a bell crank lever 140 pivotally supported at 142 intermediate its ends on the carriage 16. The end of the lever 140 with the wheels thereon is urged forcibly downwardly by a pressured drive member 144 connected at its upper end to the carriage. This drive member may comprise a drive loaded shock absorber type structure such as a gas shock and is arranged when not disabled to apply a downward pressured force on a log. The drive member 144 is normally expanded but can be retracted. Retracting movement of the member 144 is accomplished by a cable 146 connected to the end of the lever 140 opposite from the wheels and extending downwardly under a sheave 148 having journaled support on the carriage. Cable 146 extends across the carriage from the sheave 148 and is reeved under a sheave 150, also seen in FIG. 3, mounted on an upright guide 152 secured integrally on the carriage. The cable 146 is secured to the upper end of a slide bar 154 passing through the guide 152 and having a bottom roller 156 thereon. Slide bar 154 is urged downwardly by a tension spring 158 connected between the guide 152 and a bottom portion of the slide bar 154. Spring 158 tensions downward movement of the slide bar 154 when the wheels 138 are dropped for positive engagement of the roller 156 on the ramp as the carriage moves forwardly. The saw mill frame 10 is provided with a ramp 160 positioned for engagement by the roller 156 and arranged such that when the roller moves up the leading edge of the ramp it will raise the slide bar 154 which in turn pivots the lever 140 to raise the wheels 138.

It is desired that the wheels 138 be locked in their up or retracted position, and for this purpose a latch projection 164 is provided on the free end of lever 140. This latch projection is arranged for engagement with a detent 166 in a catch member 168 integral with the carriage frame. The latch member 164 will remain in latched position unless released by the operator. Release thereof is accomplished by a longitudinal push lever 170 which extends to the operator's control end of the carriage. Catch member 168 is urged to the latched position by a tension spring 172. The wheels 138 will be raised at every pass of the carriage to the end of the log, assuming that the ramp 160 is positioned so as to cause this function, and the operator must release the drive member 144 for each cut when he feels it necessary. The ramp 160 is adjustable on the frame 10 to accommodate log length, and for this purpose, it is removably and adjustably secured to the frame by C-clamps 174 or the like.

In operation, it may be desired to use any one or a combination of the stabilizers 34, 36 and 38. As an example, and with reference to FIG. 9a, the hold-down wheels 138 may desirably be released to engage the log during a first slab cut. More particularly, in the event that the log is quite small or is long whereby the carriage frame 10 has a long suspension in end supports, the wheels 138 apply a good vertical stabilizing connection between the log and the carriage. The use of the wheels at this time is important since in some cuts, especially first cuts, the horizontal saws may not have yet penetrated the log and thus it is not possible for the disc 42 to provide vertical stabilization by riding in a kerf. After initial boards or slabs have been cut, then the horizontal saw will produce a kerf and the operator can by operation of the crank 60 move the disc 42 selectively into the horizontal kerf as shown in FIG. 5. The position of disc 42 can be determined by an observation of the indicating means 80.

Also, once a vertical cut has been made on a log, the foot member 90 can be moved into abutment, by means of the crank 116, with such vertical edge. This foot will steady a log or the carriage laterally. FIG. 9b also shows the condition of a log which has been substantially completed with board cuts. When the log gets down to a small segment, namely, an upright segment and a bottom segment, the wheels 138 are very beneficial in supporting this remaining portion of the log. Since the log is quite small it can wobble laterally and vertically but stabilization can be accomplished by the use of any one or a combination of the three stabilizers. With the use of these stabilizers, a bottom segment L1 of the log, as shown in FIG. 9b, can be converted to boards simple by raising it to a vertical position, such as the position shown by the remaining vertical segment L2, dogging it in place, and then cutting boards therefrom while using a desired combination of the stabilizers.

According to the invention, more efficient board cuts can be made and also more boards can be obtained from a log. Also, both vertical and lateral stabilization can be achieved so that small logs can be efficiently converted to boards. This is accomplished by using the three stabilizing means either singly or in combination and at any time where they can come into play to produce better saw cuts.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A saw mill comprising
   an elongated supporting frame,
   a carriage driven longitudinally along the frame,
   means supporting the frame in parallel relation to a log,
   power driven vertical and horizontal saws on the carriage for producing vertical and horizontal board cuts in a cutting movement along the log,
   a depth gauge and stabilizer on said carriage,
   a foot member on said depth gauge and stabilizer having a face surface,
   said face surface having an inclined leading edge portion facing the cutting direction of said saws,
   an arm integral with said foot member arranged to support said foot member on said carriage with its face surface in slidable engagement with a vertical surface of a log to control the depth of cut of horizontal saws on the carriage,
   gear means on said arm,
   operator control gear means meshing with said gear means on the arm for adjusting the latter laterally for varying the depth of cut of the horizontal saw blades,
   operator control shaft means operating said gear means on the arm for adjusting the latter laterally,
   said operator control shaft means comprising a capstan,
   a line wound on said capstan,
   a vertical gauge having depth indicating graduations thereon,
   a pointer slidably mounted on said gauge in association with said depth indicating graduations,
   sheath means supporting said line for connection between said capstan and said pointer for indicating to an operator the depth of cut of the saw blades,
   and a gauge wheel on said shaft having graduations which further indicate the depth of cut of said saw blades.

2. A combination depth gauge and stabilizer for a saw mill of the type having an elongated supporting frame, a carriage driven longitudinally along the frame, means supporting the frame in parallel relation to a log, and power driven vertical and horizontal saws on the carriage for producing vertical and horizontal board cuts in the log, said depth gauge and stabilizer comprising:
   a foot member having a face surface,
   an arm integral with said foot member arranged to support said foot member on a carriage with its face surface in slidable engagement with a vertical surface of a log to control the depth of cut of horizontal saws on the carriage, said arm being laterally adjustable for locating said foot member in selected lateral adjustments for varying the depth of cut of the saw blade, a laterally extending support slidably supporting said arm for said lateral adjustment, gear means on said arm, and operator controlled gear means meshing with said gear means on the arm for adjusting the latter laterally, said operator controlled gear means comprising a capstan, a line wound on said capstan, and depth indicating means operated by said line for indicating to an operator the depth of cut of the saw blades.

3. The combination depth gauge and stabilizer of claim 2 wherein said depth indicating means comprises a vertical gauge having depth indicating graduations thereon, a pointer slidably mounted on said gauge in association with said depth indicating graduations, and sheath means supporting said line for connection between said capstan and said pointer and for indicating to an operator the depth of cut of the saw blades.

4. A saw mill comprising an elongated supporting frame, a carriage driven longitudinally on the frame, means supporting the frame in parallel relation to a log, power driven vertical and horizontal saws on the carriage for producing vertical and horizontal board cuts in the log, a horizontal disc on said carriage, a first arm supporting said disc on a carriage in a plane such that said disc has a portion arranged to project into a kerf made by the horizontal saw whereby to provide vertical braced stabilization between a log and the carriage, horizontal axis wheel means, link means supporting said wheel means on a said carriage in a plane closely adjacent said vertical saw such that said wheel means is arranged to roll on top of a log being cut, and hold-down means on said link means arranged to forcibly press said wheel means down on a log to provide vertical stabilization between a log and the carriage, said hold-down means comprising a resilient, force exerting shock absorber.

5. A saw mill comprising an elongated supporting frame, a carriage driven longitudinally on the frame, means supporting the frame in parallel relation to a log, power driven vertical and horizontal saws on the carriage for producing vertical and horizontal board cuts in the log, a horizontal disc on said carriage, a first arm supporting said disc on a carriage in a plane such that said disc has a portion arranged to project into a kerf made by the horizontal saw whereby to provide vertical braced stabilization between a log and the carriage, abutment means having a face surface, said face surface having an inclined leading edge portion facing the cutting direction of said saws, a second arm integral with said abutment means arranged to support said abutment means on said carriage with its face surface in slidable engagement with a vertical surface of a log to control the depth of cut of a horizontal saw on the carriage, said second arm being laterally adjustable for locating said abutment means in selected lateral adjustment for varying the depth of cut of the saw blade, horizontal axis wheel means, link means arranged to support said wheel means on a carriage in a plane closely adjacent said vertical saw such that said wheel means is arranged to roll on top of a log being cut, and hold-down means on said link means arranged to forcibly press said wheel means down on a log to provide vertical stabilization between a log and the carriage, said hold-down means comprising a resilient, force exerting shock absorber.

* * * * *